United States Patent Office 3,424,385
Patented Jan. 28, 1969

3,424,385
GAS TORCH WITH PRESSURE RESPONSIVE VALVE FOR CONVERSION FROM INTERNAL TO EXTERNAL MIXING
Traugott Gutermann, and Georg Maurer, Frankfurt am Main, Germany, assignors to Messer Griesheim G.m.b.H., Frankfurt am Main, Germany, a corporation of Germany
Filed Mar. 4, 1966, Ser. No. 531,907
Claims priority, application Germany, May 6, 1965, M 65,133
U.S. Cl. 239—412      6 Claims
Int. Cl. B05b 7/12; B23k 7/00

ABSTRACT OF THE DISCLOSURE

A gas torch is provided which is capable of internally mixing the fuel gas and oxygen during the preheating process and then automatically converting from internal mixing to external mixing by pressure responsive means.

---

Known autogenous burners, such as are used on a large scale principally as cutting or flame treatment burners, operate by producing the temperature required for preheating the surface of the workpiece by means of flames fed by a fuel gas-oxygen mixture, the gases being premixed inside the burner in the proportions required in each particular case. Burners of this type are the usual suction burners, pressure burners, constant pressure burners, and burners equipped with gas mixing nozzles (German Patent 921,492).

The advantage of this so-called burner mixing, that is to say of burners working with pre-mixed gases, namely that they are able to supply a great concentration of heat, is counteracted by the very substantial disadvantage of the possibility of backfiring, which may lead to flashback with its harmful consequences. There has therefore been a tendency to replace internal mixing by so-called external mixing, in which the fuel gas and heating oxygen are mixed downstream of the burner, viewed in the direction of flow, that is to say outside the burner nozzle (German Patent 947,849). In this case the procedure may either be to bring the heating oxygen and fuel gas passages to a point directly adjoining the burner mouth so that the heating oxygen passing out is mixed with the heating gas, which has likewise already passed out, outside the nozzle (U.S. Patent No. 2,356,196), or else the use of a separate current of heating oxygen may be dispensed with and the fuel gas is supplied with the proportion of oxygen necessary for combustion from the actual jet of cutting or flame treatment oxygen, which is allowed to flow out at an adjoining point (German Patent No. 947,849). External mixing burners of this type are distinguished by perfect freedom from backfiring, but on the other hand have the disadvantage that they have low heat concentration, which may have an unfavorable effect at the commencement of cutting or flame treatment.

In application Ser. No. 507,226 is disclosed a burner having heating nozzles from which a mixture of fuel gas and oxygen is burned, said burner having a cutting or flame treatment nozzle from which the oxygen flows out and being characterized in that the heating nozzles work with external mixing during the cutting or flame treatment operation.

With a burner of this type it is possible in a surprisingly simple and reliable manner to combine the advantage of good heating-up properties of flames composed of premixed gases, without having to take into account the disadvantage of relatively great tendency to backfire, which is not disturbing in the heating-up of the workpiece, with the advantage of security against backfiring possessed by gases which mix outside the nozzle and the low heat concentration of which is itself without importance during the actual cutting or flame treatment, thus obtaining optimum results. Through such proposals therefore the advantages of internal mixing (particularly great concentration of heat) are combined with the advantages of external mixing (particularly great security against backfiring) in a manner which does not allow the respective shortcomings of the two methods of mixing (danger of backfiring in the case of internal mixing and low concentration of heat in the case of external mixing) to come into effect.

An object of the invention is a burner having means for shutting off automatically the stream of heating oxygen before the beginning of the cutting or flame treatment operation.

According to the invention the conduit for the heating oxygen and the conduit for the cutting or scarfing lead to a shut-off valve whose shut-off member automatically closes the heating oxygen conduit upon opening of the cutting or flaming oxygen shut-off valve. At the end of the preheating process, therefore, the heating oxygen intended for the interior mixing is automatically shut off upon opening of the valve for the cutting or flaming oxygen, so that the fuel gas streaming over the mixture point of the torch leaves the cutting or flaming nozzle without admixture of heating oxygen.

In the advantageous further development of the invention it is recommended to construct the closing member for the closing valve in the form of a membrane which is impinged upon on its one side by the cutting or flaming oxygen and by a spring, if necessary, and on its other side by the heating oxygen. The membrane of the closing valve is suitably arranged at the tail end of the interior mixture nozzle. An adjusting screw can bear upon the membrane of the closing valve so that the valve can also manually be opened or closed or adjusted. The membrane of the closing valve can be situated in a chamber into which converge borings and/or lead pipes. The fuel gas and the heating oxygen conduits can each be provided with an adjusting valve and the cutting or flaming conduit with a shut-off valve.

Novel features and advantages of the present invention will become apparent to one skilled in the art from a reading of the following description in conjunction with the accompanying drawings wherein similar reference characters refer to similar parts and in which.

In general this inventon thereby permits the heating oxygen to be emitted from the torch during, for example, pre-heating. When the valve controlling the operating gas, such as cutting or flaming oxygen, is later opened the heating gas is cut off to prevent internal mixing, and the operating gas is externally mixed with the fuel gas.

Figure 1:
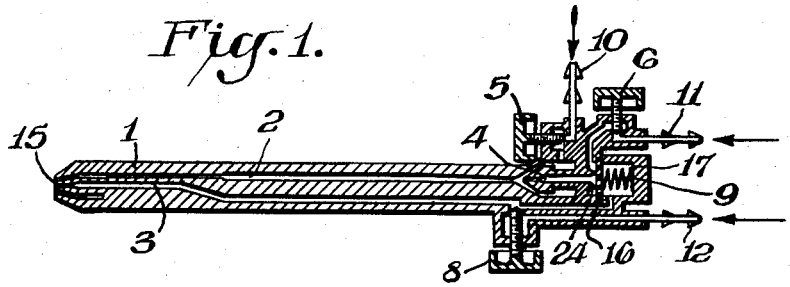
FIG. 1 shows a torch with three separated lead pipes for fuel gas, heating oxygen, and cutting or flaming oxygen.
Figure 2:
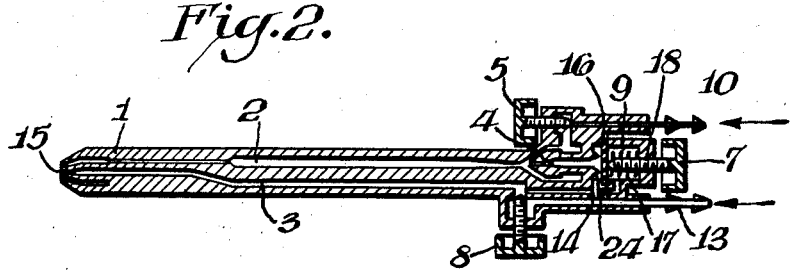
FIG. 2 shows a torch with two lead pipes for fuel gas and oxygen.

The torch according to FIGS 1 and 2 consists of a torch member 1 with heating gas canal 2 and the operating gas, such as cutting or flaming oxygen, canal 3, the interior mixture nozzle 4, adjusting valves 5 and 6 (FIG. 1) or 7 (FIG. 2), the shut-off valve 8 and the membrane closing valve 9. The tube attachment for the fuel gas is shown as 10 in FIG. 1, for the heating oxygen as 11, and for the cutting or flaming oxygen with 12. The torch according to FIG. 1 also has three tube attachments, while the torch according to FIG. 2 has only two tube attachments. The attachments shown in FIG. 2 are the connection 10 for the fuel gas, and the connection 13 for the oxygen. In FIG. 2 the heating oxygen is branched off by boring 14 from the cutting or flaming oxygen within the torch. Thus the heating gas travels between membrane 16 and nozzle 4 during, for example, pre-heating. During subsequent operation, however, the exterior mixing of the fuel gas with the cutting or flaming oxygen occurs at the tip 15 of the torch. Membrane 16 of the closing valve 9 is impinged upon on its one side by the heating oxygen and on its other side by a spring 17 and the cutting or flaming oxygen. When the shut-off valve 8 for the cutting or flaming oxygen is opened, the combined action of the cutting or flaming oxygen and spring 17 forces membrane 16 against the tube shaped tail end 24 of nozzle 4 and thus shuts off the heating oxygen.

Figure 4:
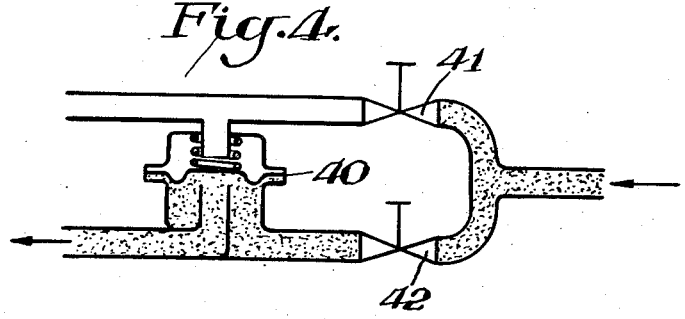
FIGS. 4 and 5 show simplified representations of the oxygen conduits for the inventive torch for illustrating different phases of operation.
Figure 5:
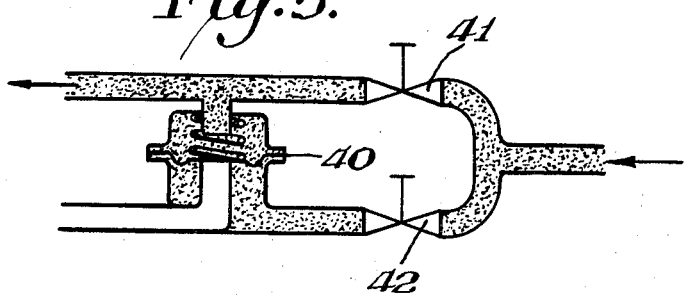

The above process is clearly shown in FIGS. 4 and 5 where the membrane closing valve is shown as 40 and the shut-off valve for the cutting or flaming oxygen is 41 and the adjusting valve for the heating oxygen is 42. As indicated in FIG. 4 during, for example, preheating when valve 41 is closed, membrane valve 40 is open permitting the heating oxygen to flow therethrough. When valve 41 is opened, valve 40 is forced shut to prevent the flow of heating oxygen therethrough as shown in FIG. 5.

A further distinction between the torch embodiment according to FIGS. 1 and 2 is that the torch of FIG. 2 has an adjusting screw 18 mounted upon its membrane closing valve 9 so that the closing valve 9 can simultaneously be activated by hand, whereupon it acts as an adjusting valve.

Figure 3:
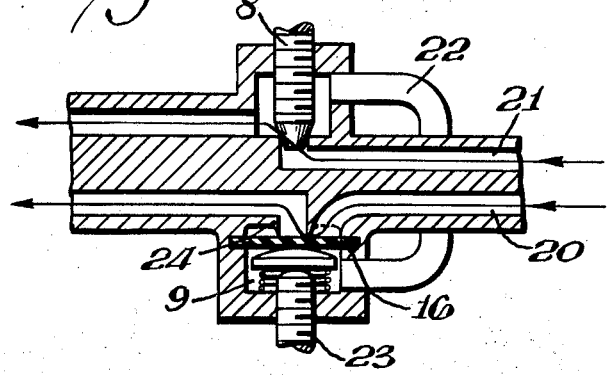
FIG. 3 shows an embodiment of a membrane closing valve situated in the heating oxygen conduit.

In the embodiment according to FIG. 3, the closing valve 9 with its membrane 16 situated directly in the heating oxygen conduit 20, while the cutting oxygen is introduced from lead pipe 21 with open valve 8 through branched-off conduit 22 to the other side of the membrane. Even here valve 9 is at the same time an adjusting valve, for which purpose the adjusting screw 23 is provided.

It is understood that the invention is in no way limited to the embodiments above described and shown in the drawings. Furthermore, there are various possibilities for changes in construction of the torch and in the arrangement of the individual parts without thereby deviating from the scope of the invention. Instead of the membrane closing valve 9 or 40, a plunger valve can also be used whose plunger is impacted at both sides by pressure. Furthermore, the membrane 16 of the membrane closing valve can be arranged at various locations of the torch as shown for example in FIGS. 1 and 2 as well as 3.

Obviously, many modifications and variations of the present invention are possible in the light of the above teachings.

What is claimed is:

1. In a gas torch for thermal working of metal work pieces including a torch body, gas passage means in said body, means for feeding fuel gas to said passage means, an oxygen passageway in said body, means for feeding oxygen to said passageway, said passage means and said passageway being disposed for external mixing of the gases emitted therefrom, an internal mixing chamber in said body, said passage means communicating with said chamber to permit fuel gas to flow to said chamber, means for supplying oxygen to said chamber to permit the oxygen to mix with the fuel gas internally in said body, pressure responsive valve means upstream from said chamber to prevent oxygen from entering said chamber, a by-pass leading from said passageway to the upstream side of said valve means to close said valve means and prevent internal mixing when oxygen flows through said by-pass above a predetermined pressure, and means for controlling the flow of oxygen through said by-pass whereby oxygen and fuel gas mix internally when the flow of oxygen through said by-pass is below said predetermined pressure and the internal mixing is automatically prevented when the flow of oxygen through said by-pass is above said predetermined pressure with oxygen and fuel gas then mixing externally of said body.

2. In a torch as set forth in claim 1 wherein said pressure responsive valve means includes a valve seat and a movable valve disk disposed for seating against said valve seat to close off flow therethrough.

3. In a torch as set forth in claim 2 wherein said means for supplying oxygen to said chamber is a branch passage from said oxygen passageway upstream from said means for controlling the flow of oxygen and terminating between said valve seat and said valve disk when said valve disk is moved away from said valve seat whereby oxygen may flow from said passageway and through said valve seat to mix internally with the fuel gas when said valve seat is opened and is prevented from mixing internally with the fuel gas when said valve seat is closed.

4. In a torch as set forth in claim 2 wherein said means for supplying oxygen to said chamber is a second oxygen passageway in said body, means for supplying oxygen to said second passageway, said second passageway terminating between said valve seat and said valve disk when said valve disk is moved away from said valve seat whereby oxygen may flow from said second passageway and through said valve seat to mix internally with the fuel gas when said valve seat is opened and is prevented from mixing with the fuel gas when said valve seat is closed.

5. In a torch as set forth in claim 4 wherein said internal mixing chamber is disposed in said second passageway.

6. In a torch as set forth in claim 2 wherein said valve disk is a pressure responsive membrane.

References Cited

UNITED STATES PATENTS

| | | | |
|---|---|---|---|
| 1,721,569 | 7/1929 | McCutcheon | 239—412 |
| 2,430,511 | 11/1947 | Hughey | 239—416.2 |
| 3,204,682 | 9/1965 | Teleshefsky et al. | 158—27.4 |

M. HENSON WOOD, JR., *Primary Examiner.*

HOWARD NATTER, *Assistant Examiner.*

U.S. Cl. X.R.

239—416.1, 417.5, 416.2, 427